United States Patent
Yao et al.

(10) Patent No.: US 11,602,176 B2
(45) Date of Patent: Mar. 14, 2023

(54) POWER SUPPLY ASSEMBLY, ATOMIZER, AND ELECTRONIC ATOMIZING DEVICE

(71) Applicant: SHENZHEN SMOORE TECHNOLOGY LIMITED, Shenzhen (CN)

(72) Inventors: Gaoren Yao, Shenzhen (CN); Juntao Wu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 365 days.

(21) Appl. No.: 17/022,316

(22) Filed: Sep. 16, 2020

(65) Prior Publication Data

US 2021/0084984 A1    Mar. 25, 2021

(30) Foreign Application Priority Data

Sep. 20, 2019   (CN) .......................... 201921568565.4
Jan. 10, 2020   (CN) .......................... 202010025818.4

(51) Int. Cl.
*A24F 40/485*   (2020.01)
*A24F 40/10*   (2020.01)

(52) U.S. Cl.
CPC ............ *A24F 40/485* (2020.01); *A24F 40/10* (2020.01)

(58) Field of Classification Search
CPC ......... H01M 10/0525; H01M 2220/30; H01M 50/209; H01M 50/24; H01M 50/247; H01M 50/317; H01M 50/358; A24F 40/10; A24F 40/485; A24F 40/40; A24F 40/42; Y02E 60/10
See application file for complete search history.

(56) References Cited

U.S. PATENT DOCUMENTS

| 10,631,576 B1 * | 4/2020 | Chen ....................... A24F 40/42 |
| 2015/0173417 A1 | 6/2015 | Gennrich et al. |

(Continued)

FOREIGN PATENT DOCUMENTS

| CN | 203040678 U | 7/2013 |
| CN | 204949527 U | 1/2016 |

(Continued)

OTHER PUBLICATIONS

Extended European Search Report for European Application No. 20196849.2 dated Feb. 11, 2021.

*Primary Examiner* — Jean F Duverne
(74) *Attorney, Agent, or Firm* — Dorsey & Whitney LLP

(57) ABSTRACT

The present disclosure relates to an atomizer, a power supply assembly, and an electronic atomizing device. The electronic atomizing device includes an atomizer provided with an air inhaling channel therein for inhalation of aerosol, a power supply assembly supplying power to the atomizer and provided with a receiving cavity, a functional channel providing communication between the air inhaling channel and the receiving cavity, and a cushion plug disposed in the functional channel. When a difference between air pressure in the receiving cavity and air pressure in the air inhaling channel is less than a threshold pressure, the functional channel is in an open state. When the difference between the air pressure in the receiving cavity and the air pressure in the air inhaling channel exceeds the threshold pressure, the functional channel is in a closed state.

20 Claims, 17 Drawing Sheets

(56) References Cited

U.S. PATENT DOCUMENTS

2017/0196268 A1 7/2017 Reevell
2019/0297952 A1* 10/2019 Qiu .................. A24F 40/48
2022/0071283 A1* 3/2022 Qiu .................. A24F 40/42

FOREIGN PATENT DOCUMENTS

| CN | 206727144 U | 12/2017 |
|----|-------------|---------|
| CN | 208523779 U | 2/2019  |
| CN | 208819948 U | 5/2019  |

* cited by examiner

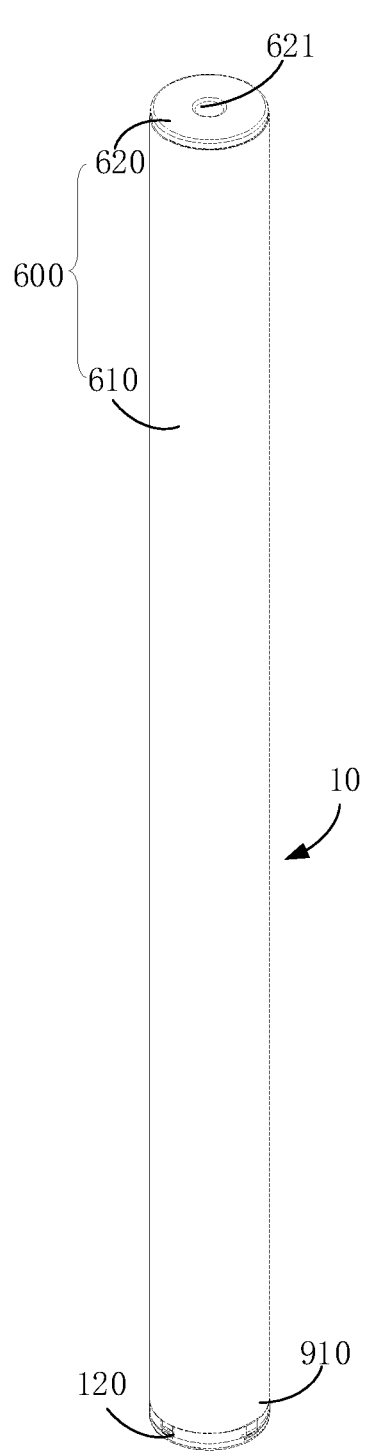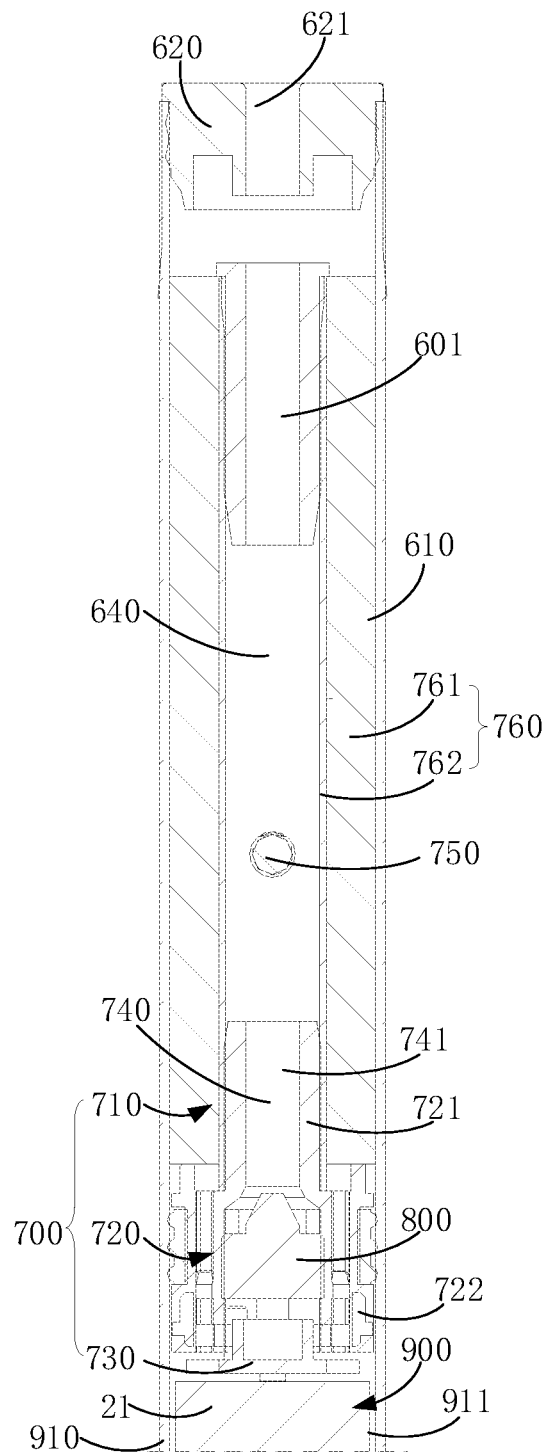
FIG. 15 · FIG. 16

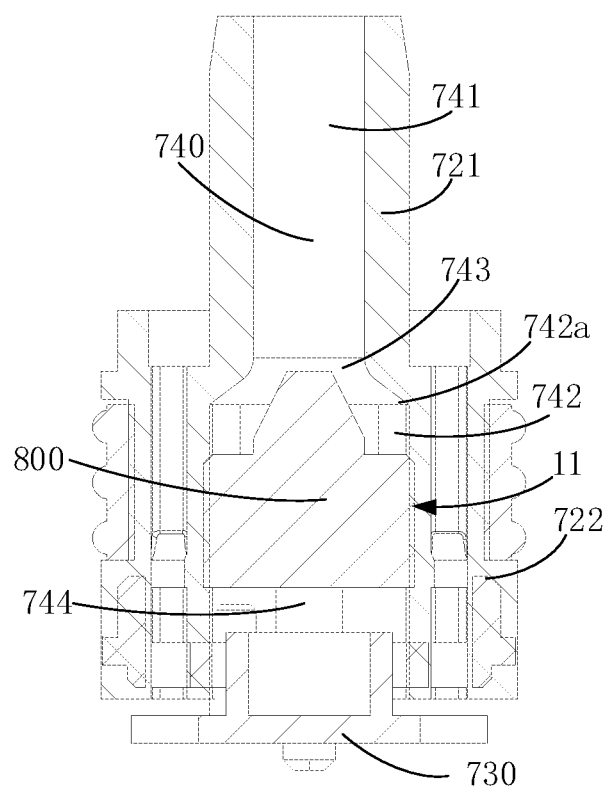 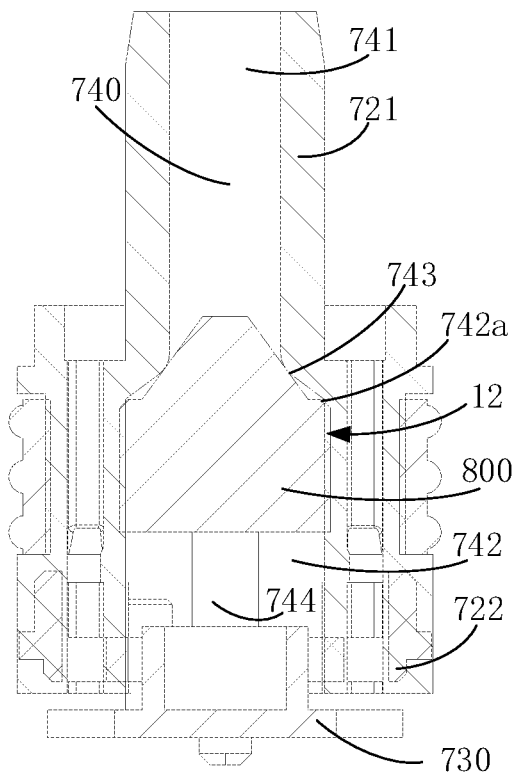
FIG. 19                    FIG. 20

POWER SUPPLY ASSEMBLY, ATOMIZER, AND ELECTRONIC ATOMIZING DEVICE

CROSS-REFERENCE TO RELATED APPLICATIONS

This application claims priority to Chinese Patent Application No. 2020100258184, entitled "POWER SUPPLY ASSEMBLY, ATOMIZER, AND ELECTRONIC ATOMIZING DEVICE", filed Jan. 10, 2020 and priority to Chinese Patent Application No. 2019215685654, entitled "ELECTRONIC ATOMIZING DEVICE AND ATOMIZER THEREOF", filed Sep. 20, 2019, the entire content of which are incorporated herein by reference.

TECHNICAL FIELD

The present disclosure relates to power supply assemblies, atomizers, and electronic atomizing devices.

BACKGROUND

An electronic atomizing device has an appearance and taste similar to those of an ordinary cigarette, but usually do not contain harmful components such as tar and suspended particles in the cigarette. Therefore, the electronic atomizing devices are generally used as a substitute for cigarettes. However, for the conventional electronic atomizing device, when a power supply assembly explodes under extreme conditions, the electronic atomizing device will cause various injuries to consumers, resulting in that the safety performance of the electronic atomizing device is difficult to meet user's needs.

SUMMARY

According to various embodiments of the present disclosure, atomizers, power supply assemblies, and electronic atomizing devices are provided.

An electronic atomizing device includes: an atomizer provided with an air inhaling channel therein for inhalation of aerosol; a power supply assembly comprising a battery, wherein the power supply assembly is connected to the atomizer and supplies power to the atomizer, the power supply assembly is provided with a receiving cavity configured to receive the battery; a functional channel providing communication between the air inhaling channel and the receiving cavity; and a cushion plug disposed in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

A power supply assembly of an electronic atomizing device is configured to be connected to an atomizer provided with an air inhaling channel. The power supply assembly includes a battery and a cushion plug. The power supply assembly is provided with a functional channel and a receiving cavity. The functional channel is in communication with the receiving cavity and the air inhaling channel. The battery is located in the receiving cavity, the cushion plug is located in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

An atomizer of an electronic atomizing device is configured to be connected to a power supply assembly. The power supply assembly includes a battery. The power supply assembly is provided with a receiving cavity configured to receive the battery. The atomizer includes a cushion plug and is provided with a functional channel and an air inhaling channel. The air inhaling channel is configured for inhalation of aerosol. The functional channel is in communication with the receiving cavity and the air inhaling channel. The cushion plug is located in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

BRIEF DESCRIPTION OF THE DRAWINGS

FIG. 15 is a perspective view of an electronic atomizing device according to a first example in another embodiment.

FIG. 16 is a partial cross-sectional view of the electronic atomizing device in FIG. 15.

FIG. 19 is a partial cross-sectional view showing a cushion plug in FIG. 15 located in a first station.

FIG. 20 is a partial cross-sectional view showing the cushion plug in FIG. 15 located in a second station.

DETAILED DESCRIPTION OF THE EMBODIMENTS

Figure 1:
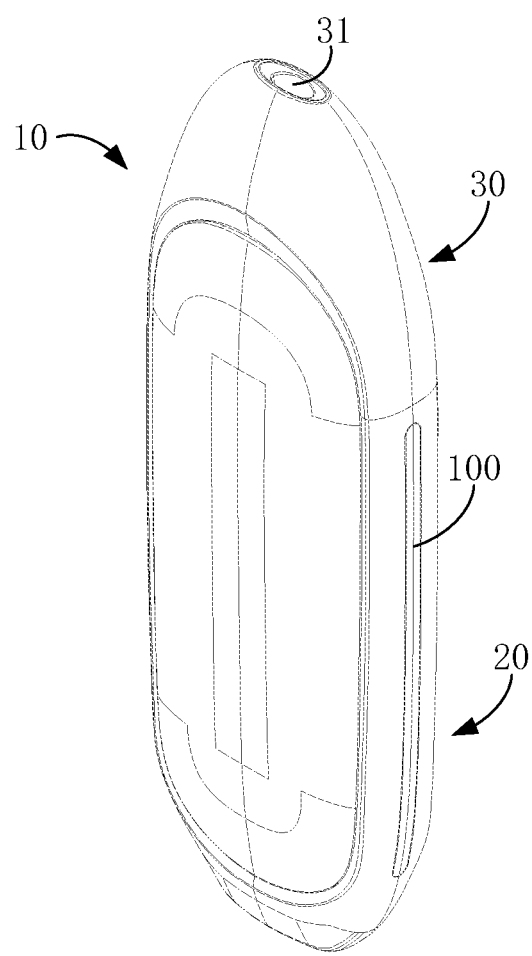
FIG. 1 is a perspective view of an electronic atomizing device according to a first example in an embodiment.

For the convenience of understanding of the present disclosure, the present disclosure will be described more fully with reference to related drawings. However, the present disclosure can be implemented in many different forms and is not limited to the embodiments described herein. In contrast, providing these embodiments is to providing a fully and thoroughly understanding of the disclosure of the present disclosure.

It should be noted that when an element is referred as to be "fixed" to another element, it can be directly on another element or there may be an intermediate element therebetween. When an element is considered to be "connected" to another element, it may be directly connected to another element or there may be an intermediate element therebetween at the same time. The terms "inner", "outer", "left", "right" and the like used herein are for illustration only and are not meant to be the only embodiment.

According to an aspect of the present disclosure, an electronic atomizing device is provided, and which includes: an atomizer provided with an air inhaling channel therein for inhalation of aerosol; a power supply assembly including a battery, wherein the power supply assembly is connected to the atomizer and supplies power to the atomizer, the power supply assembly is provided with a receiving cavity configured to receive the battery; a functional channel providing communication between the air inhaling channel and the receiving cavity; and a cushion plug disposed in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

In one of the embodiments, the threshold pressure may be in a range of about 1 KPa to about 2 MPa.

In one of the embodiments, the threshold pressure may be in a range of about 2 KPa to about 2 MPa.

In one of the embodiments, the threshold pressure may be in a range of about 10 KPa to about 1 MPa.

In one of the embodiments, the cushion plug may encounter resistance to movement from the first station to the second station in the functional channel.

In one of the embodiments, the power supply assembly may be further provided with an air inlet channel providing communication between outside and the receiving cavity. Outside air is capable of entering the air inhaling channel by sequentially passing through the air inlet channel, the receiving cavity, and the functional channel.

In one of the embodiments, the atomizer may be provided with an air inlet channel providing communication between outside and the air inhaling channel. Outside air is capable of directly entering the air inhaling channel by passing through the air inlet channel.

In one of the embodiments, the power supply assembly may further include a housing. The receiving cavity is provided in the housing. The housing has a first end wall disposed adjacent to the atomizer. The receiving cavity may be located on a side of the first end wall away from the atomizer. The functional channel may include an air guiding channel provided on the first end wall. The cushion plug may be elastically connected to the housing, and disposed on the side of the first end wall away from the atomizer. When the cushion plug moves from the first station to the second station by overcoming an elastic resistance, the cushion plug abuts against the first end wall and blocks the air guiding channel.

In one of the embodiments, the electronic atomizing device may further include a relief plug. The housing may further have a second end wall defining a portion of a boundary of the receiving cavity. The second end wall may be farther away from the atomizer than the first end wall. The relief plug may be connected to the second end wall. When an air pressure difference applied on the relief plug exceeds a predetermined value, the relief plug is capable of forming a relief channel providing communication between the outside and the receiving cavity.

In one of the embodiments, the second end wall may be provided with a fixing hole providing communication between the receiving cavity and the outside, the relief plug may include: a sleeve engaged with the fixing hole and provided with a through hole; a lug connected to the second end wall; and a plurality of leaflets arranged on a side wall of the through hole at intervals in a circumferential direction. When an air pressure difference applied on the plurality of leaflets is less than a predetermined value, all of the leaflets at least shield a portion of the through hole. When the air pressure difference applied on the plurality of leaflets exceeds the predetermined value, the leaflets move close to the side wall, such that the through hole is opened to form the relief channel.

In one of the embodiments, the cushion plug may be disposed in the functional channel by means of interference fit. When the difference between the air pressure in the receiving cavity and the air pressure in the air inhaling channel exceeds the threshold pressure, the cushion plug moves from the first station to the second station by overcoming a frictional resistance.

In one of the embodiments, the atomizer may include: an atomizing assembly above which the air inhaling channel is located; and a base assembly inserted into the air inhaling channel. The functional channel may be located above the base assembly.

In one of the embodiments, the base assembly may be provided with a first hole and a second hole in communication with the first hole. A size of a cross section of the second hole is less than a size of a cross section of the first hole, and the second hole is in communication with the air inhaling channel. The cushion plug may be located in the first hole. A flow guiding channel is further formed between a side wall of the first hole and an outer wall of the cushion plug, or a flow guiding channel is further formed in the cushion plug. The first hole, the second hole, and the flow guiding channel may together form the functional channel. When the cushion plug is kept at a predetermined distance from a top wall of the first hole to open the flow guiding channel, the cushion plug is located at the first station. When the cushion plug abuts against the top wall of the first hole to block the flow guiding channel, the cushion plug is located at the second station.

In one of the embodiments, the functional channel may further include a tapered hole in communication with the first hole and the second hole. The tapered hole may be located between the first hole and the second hole. The cushion plug may include: a first blocking portion engaged with the first hole; and a second blocking portion connected to the first blocking portion. When the cushion plug is located at the second station, the first blocking portion abuts against a bottom wall of the first hole, and the second blocking portion is engaged with the tapered hole.

In one of the embodiments, the flow guiding channel may be a slot provided on the side wall of the first hole or the outer wall of the cushion plug.

In one of the embodiments, the flow guiding channel may be a through hole provided in the cushion plug. An axial projection of the through hole may be located outside an outline of the second hole.

In one of the embodiments, the atomizing assembly may further include a stopper connected to an end of the base assembly. The stopper may be disposed opposite to the battery. An orthographic projection of the stopper on the base assembly may cover the functional channel.

According to another aspect of the present disclosure, a power supply assembly of an electronic atomizing device is provided, which may be configured to be connected to an atomizer provided with an air inhaling channel. The power supply assembly includes a battery and a cushion plug. The power supply assembly is provided with a functional channel and a receiving cavity. The functional channel is in communication with the receiving cavity and the air inhaling channel. The battery is located in the receiving cavity, the cushion plug is located in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

In one of the embodiments, the power supply assembly may be further provided with an air inlet channel. Outside air may enter the air inhaling channel by sequentially passing through the air inlet channel, the receiving cavity, and the functional channel.

According to yet another aspect of the present disclosure, an atomizer of an electronic atomizing device is provided, which may be configured to be connected to a power supply assembly. The power supply assembly includes a battery. The power supply assembly is provided with a receiving cavity configured to receive the battery. The atomizer includes a cushion plug and is provided with a functional channel and an air inhaling channel. The air inhaling channel is configured for inhalation of aerosol. The functional channel is in communication with the receiving cavity and the air inhaling channel. The cushion plug is located in the functional channel. When a difference between air pressure in the receiving cavity and air pressure in the air inhaling channel is less than a threshold pressure, the cushion plug is located at a first station, such that the functional channel is in an open state. When the difference between the air pressure in the receiving cavity and the air pressure in the air inhaling channel exceeds the threshold pressure, the cushion plug moves from the first station to a second station, such that the functional channel is in a closed state.

In one of the embodiments, the atomizer may be further provided with an air inlet channel providing communication between outside and the air inhaling channel. Outside air may directly enter the air inhaling channel by passing through the air inlet channel.

The present disclosure can achieve the following technical effects: when the difference between the air pressure in the receiving cavity and the air pressure in the air inhaling channel is less than a threshold pressure, the cushion plug is located at the first station, such that the functional channel is in an open state, and the user can inhale aerosol through the air inhaling channel. When the battery is in an abnormal state of explosion under extreme conditions, the difference between the air pressure in the receiving cavity and the air pressure in the air inhaling channel exceeds the threshold pressure, the cushion plug moves from the first station to a second station, such that the functional channel is in a closed state. Therefore, the high-pressure gases and the harmful substances generated by the explosion of the battery cannot pass through the functional channel to enter the air inhaling channel to be inhaled by the user, thereby improving the safety performance of the entire electronic atomizing device.

Referring to FIGS. 1 to 4, an electronic atomizing device 10 according to a first example in an embodiment of the present disclosure includes a power supply assembly 20, an atomizer 30, and a cushion plug 300. The power supply assembly 20 is used to supply power to the atomizer 30. The atomizer 30 can convert electrical energy into heat energy, so as to atomize liquid in the atomizer 30 to form aerosol for inhalation by a user. The atomized liquid can be an aerosol generating substrate or the like. The power supply assembly 20 includes a housing 100 and a battery 200.

Referring to FIGS. 1 to 5, in some examples, the atomizer 30 is provided with an air inhaling channel 31 therein. The air inhaling channel 31 is in communication with the outside. The housing 100 has a first end wall 111 and a second end wall 112 which are oppositely disposed. The first end wall 111 is disposed adjacent to the atomizer 30, and the second end wall 112 is disposed away from the atomizer 30. In other words, the first end wall 111 is closer to the atomizer 30 than the second end wall 112. The housing 100 is provided with a functional channel, a receiving cavity 110, and an air inlet channel 120 which are communicated in sequence. The functional channel includes an air guiding channel 130 extending through the first end wall 111 and in communication with the air inhaling channel 31, and a sub-cavity 101 located on a side of the first end wall 111 away from the atomizer 30. The sub-cavity 101 can be regarded as a space formed by the first end wall 111 being recessed or deformed toward the atomizer 30. This space is used for receiving the cushion plug 300, and this space is opened away from the atomizer 30, such that the air guiding channel 130 is in communication with the receiving cavity 110. A portion of the receiving cavity 110 is used for receiving the battery 200, and the remaining portion of the receiving cavity 110 is used for transmitting air. The air inlet channel 120 is provided on the second end wall 112 and is in communication with the outside and the receiving cavity 110. During inhaling, outside air enters from the air inlet channel 120 and sequentially passes through the receiving cavity 110 and the functional channel to reach the air inhaling channel 31. The air entering the air inhaling channel 31 carries the aerosol to be inhaled by the user.

In some examples, the cushion plug 300 is a silicone cushion plug 300, that is, the cushion plug 300 is made of a silicone material, such that the cushion plug 300 has a certain flexibility to be elastically connected to the housing 100. As shown in FIGS. 6 and 7, the cushion plug 300 includes a sealing portion 310 and a mounting portion 320. The sealing portion 310 has a block structure, and the mounting portion 320 has a substantially U-shaped strip structure. The sealing portion 310 is connected to the middle of the mounting portion 320. The sealing portion 310 is located in the sub-cavity 101 and is disposed opposite to the air guiding channel 130. That is, the sealing portion 310 is located on the side of the first end wall 111 away from the atomizer 30. The housing 100 is provided with mounting holes 113. Both ends of the mounting portion 320 are inserted into the mounting holes 113, thereby fixing the mounting portion 320 to the housing 100. More specifically, the mounting holes 113 may be provided on the side of the first end wall 111 away from the atomizer 30.

When the battery 200 is normal, that is, when the battery 200 is in a normal state, while the user inhales through the air inhaling channel 31, a difference between the air pressure in the receiving cavity 110 and the air pressure in the air inhaling channel 31 is less than a threshold pressure, the cushion plug 300 is located at a first station where the sealing portion 310 forms a certain clearance apart from the first end wall 111, such that the sealing portion 310 does not block the air guiding channel 130, it is ensured that the receiving cavity 110 is in communication with the air inhaling channel 31 through the air guiding channel 130 and the sub-cavity 101, and the air in the receiving cavity 110 can enter the air inhaling channel 31 from the air guiding channel 130 during the inhaling. When the battery 200 is abnormal (for example, exploded), that is, when the battery 200 is in an abnormal state of explosion, a strong high-pressure gas is formed in the receiving cavity 110. Due to the effect of the high-pressure gas, the difference between the air pressure in the receiving cavity 110 and the air pressure in the air inhaling channel 31 exceeds the threshold pressure, the cushion plug 300 itself will be elastically deformed and move from the first station to a second station, such that the sealing portion 310 can be pressed abut the first end wall 111 at the second station 111, thereby immediately forming a blocking effect on the air guiding channel 130. The high-temperature gases and harmful substances generated by the explosion of the battery 200 will not be able to enter the air inhaling channel 31 from the receiving cavity 110 through the air guiding channel 130, thereby preventing the high-temperature gases and the harmful substances from being inhaled by the user, and improving the safety performance of the entire electronic atomizing device 10. Meanwhile, the high-pressure gas in the receiving cavity 110 can be discharged from the air inlet channel 120 to prevent the gas in the receiving cavity 110 from generating impact in a direction toward the air inhaling channel 31, such that the safety performance of the electronic atomizing device 10 is improved to a certain extent.

Of course, the cushion plug 300 may also be elastically connected to the housing 100 through a spring. In the case that the difference between the air pressure in the receiving cavity 110 and the air pressure in the air inhaling channel 31 exceeds the threshold pressure, the spring is elastically deformed but the cushion plug 300 itself will not be elastically deformed, such that the cushion plug 300 can move from the first station to the second station against an elastic resistance of the spring. The threshold pressure may be in a range of 1 KPa to 2 MPa. The threshold pressure may specifically be 1 KPa, 2 KPa, 1.5 MPa or 2 MPa. The threshold pressure may also be in a range of 2 KPa to 2 MPa, or 10 KPa to 1 MPa. When the threshold pressure is in a range of 10 KPa to 1 MPa, on the one hand, the cushion plug 300 can be prevented from moving from the first station to the second station due to the excessive inhalation by the user, and on the other hand, the cushion plug 300 can be moved from the first station to the second station in time to block the air guiding channel 130 in the early stage of the explosion of the battery 200.

Referring to FIGS. 7 and 9, a surface of the sealing portion 310 facing the first end wall 111 is recessed to form a groove 311. The groove 311 is disposed opposite to the air guiding channel 130. In the abnormal state of the explosion of the battery 200, since a thickness of a portion of the sealing portion 310 corresponding to the groove 311 is thinner and relatively easier to deform, when the surface of the sealing portion 310 abuts against the first end wall 111, a bottom wall of the groove 311 can be inserted into the air guiding channel 130 by the pressure of the high-pressure gas, such that the sealing between the sealing portion 310 and the air guiding channel 130 is further enhanced.

As shown in FIG. 8, the second end wall 112 is provided with a fixing hole **112*a*, which provide communication between the receiving cavity 110 and the air inlet channel 120. The power supply assembly 20 further includes a relief plug 400 disposed at the fixing hole 112*a*. The relief plug 400 is made of silicone materials, such that the relief plug 400 has certain flexibility. As shown in FIGS. 9 and 10, the relief plug 400 includes a sleeve 420, lugs 430, and leaflets 410. The sleeve 420 is inserted into the fixing hole 112*a* in an axial direction. Two lugs 430 are disposed opposite to each other, and are disposed at the same end of the sleeve 420, and extend out in a circumferential direction to be fixedly connected to the second end wall 112, such that the mounting of the relief plug 400 on the housing 100** is achieved.

As shown in FIGS. 10 and 11, the sleeve 420 is provided with a through hole 421. A plurality of the leaflets 410 are arranged on a side wall of the through hole 421 at intervals in the circumferential direction. All of the leaflets 410 can at least shield a portion of the through hole 421. The leaflets 410 may have a fan shape. In the normal state, the air pressure difference applied on the leaflets 410 is less than a predetermined value, all of the leaflets 410 are arranged horizontally and can shield a portion of the through hole 421, and a narrow gap 411 is formed between two adjacent leaflets 410.

In the abnormal state such as the explosion of the battery 200, the high-pressure gas in the receiving cavity 110 will apply a strong pressure on the leaflets 410, and the air pressure difference applied on the leaflets 410 exceeds the predetermined value, such that the leaflets 410 horizontally arranged swing toward the air inlet channel 120 to be vertically arranged and attached to the side wall of the through hole 421. Then, the gap 411 between the leaflets 410 becomes larger, until the entire through hole 421 will be completely opened. The through hole 421 becomes a relief channel **421*a*. The relief channel 421*a* provides communication between the receiving cavity 110 and the air inlet channel 120. The high-pressure gas in the receiving cavity 110 will be discharged from the air inlet channel 120 through the through hole 421 (or the relief channel 421*a*). Since the relief channel 421*a* is provided, and the air inlet channel 120** includes a communicating section 121 in direct communication with the receiving cavity 110, the high-pressure gas in the receiving cavity 110 can not only enter the air inlet channel 120 from the communicating section 121, but also enter the air inlet channel 120 through the through hole 421. That is, through this configuration, the number of a discharging path of the gas is increased, such that the high-pressure gas in the receiving cavity 110 is quickly discharged from the air inlet channel 120 in a short time, thereby further preventing the air in the receiving cavity 110 from impacting toward the air guiding channel 130.

In the case where the leaflets 410 have a fan shape, the gaps 411 formed between all of the leaflets 410 will be radial. That is, one ends of the gaps 411 are located on the central axis of the sleeve 420, and the other ends of the gaps 411 are evenly distributed on the same circumference. For example, when the number of the leaflets 410 is four, the gaps 411 have a cross-shaped radial shape, and a connecting line between the positions where the other ends of the gaps 411 are located forms a square. For another example, when the number of the leaflets 410 is three, a connecting line between the positions where the other ends of the gaps 411 are located forms an equilateral triangle. When the number of the leaflets 410 is six, a connecting line between the positions where the other ends of the gaps 411 are located forms a regular hexagon.

Figure 2:
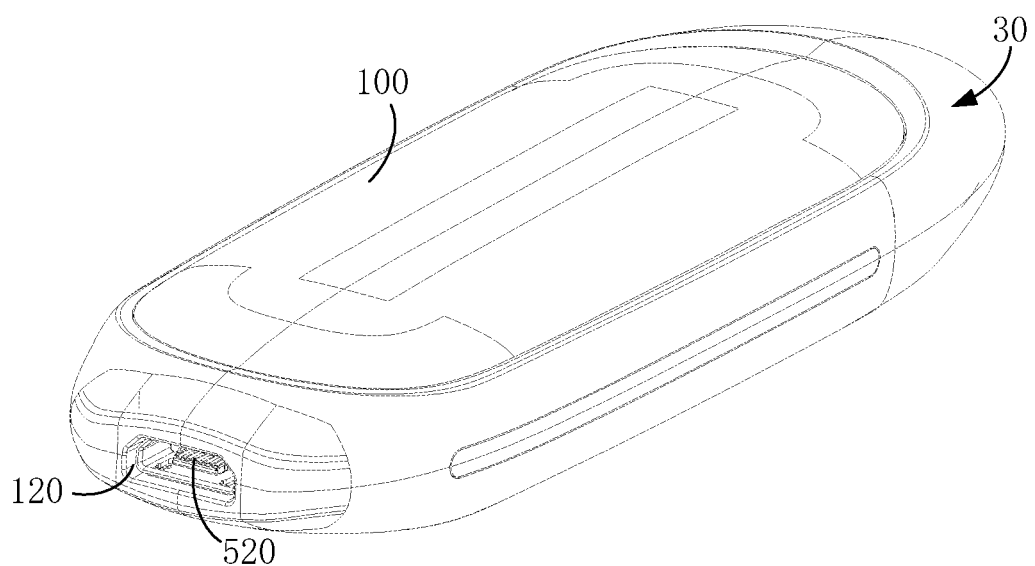
FIG. 2 is a perspective view of the electronic atomizing device in FIG. 1 from another perspective.
Figure 3:
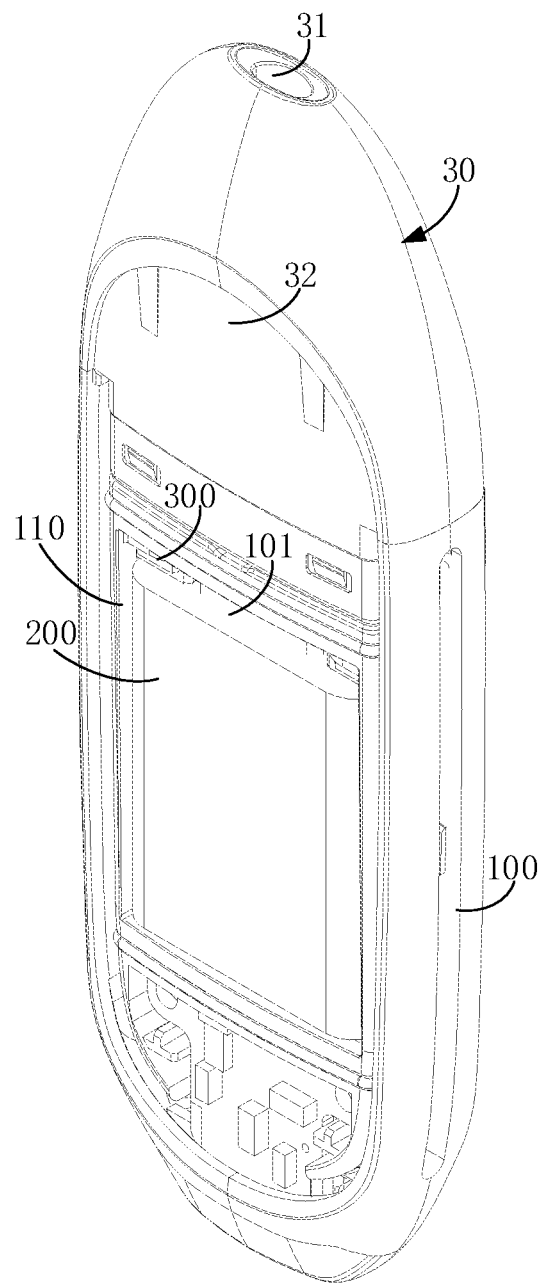
FIG. 3 is a perspective view of the electronic atomizing device in FIG. 1, where a housing thereof is partially removed.
Figure 4:
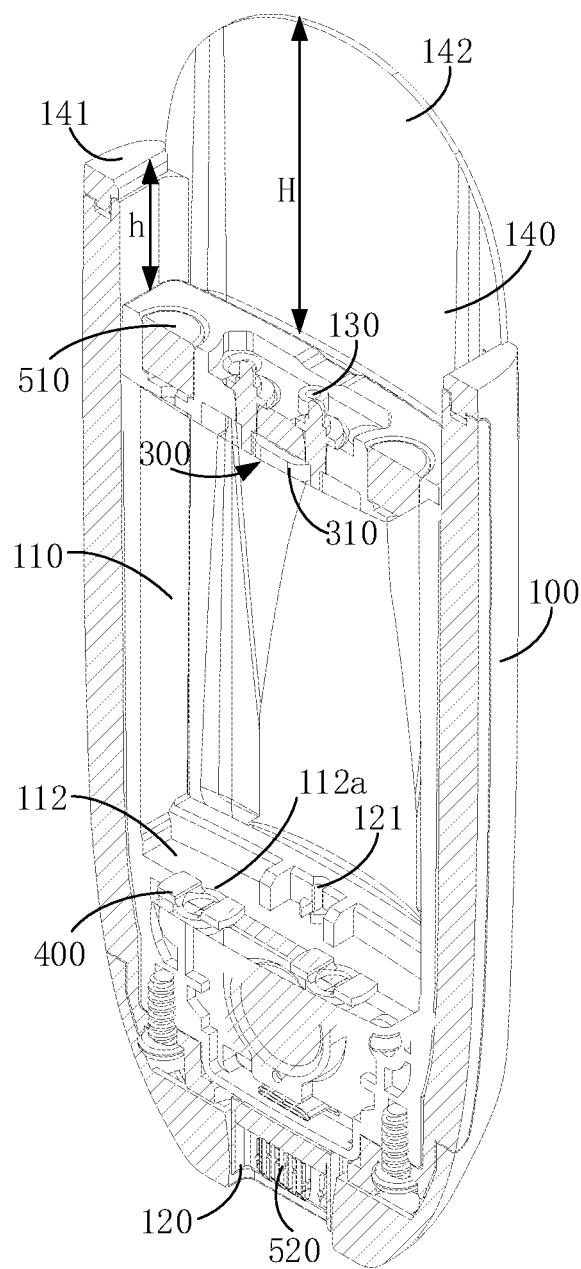
FIG. 4 is a perspective cross-sectional view of the electronic atomizing device in FIG. 3, where a battery and an atomizer are removed.
Figure 5:
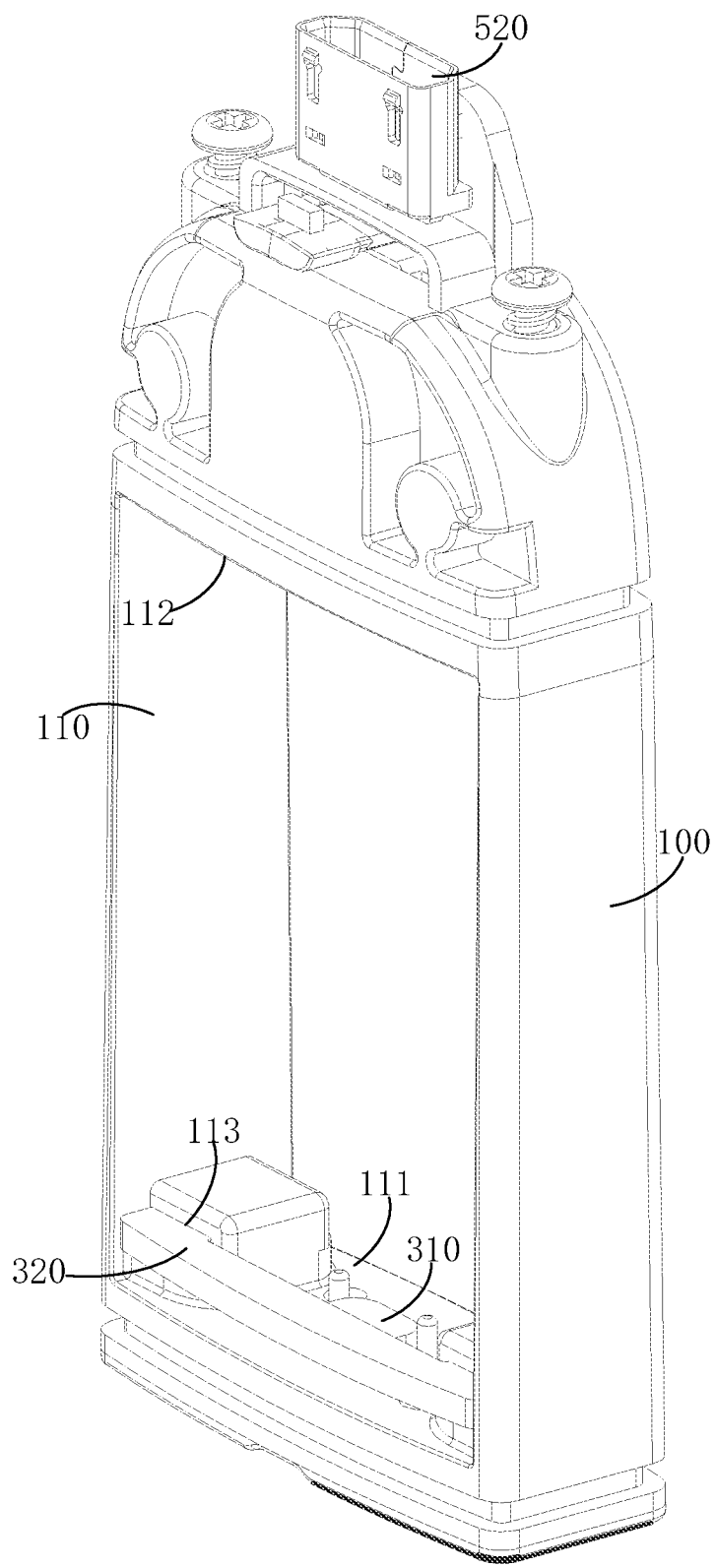
FIG. 5 is a partial perspective view of the electronic atomizing device in FIG. 1.
Figure 6:
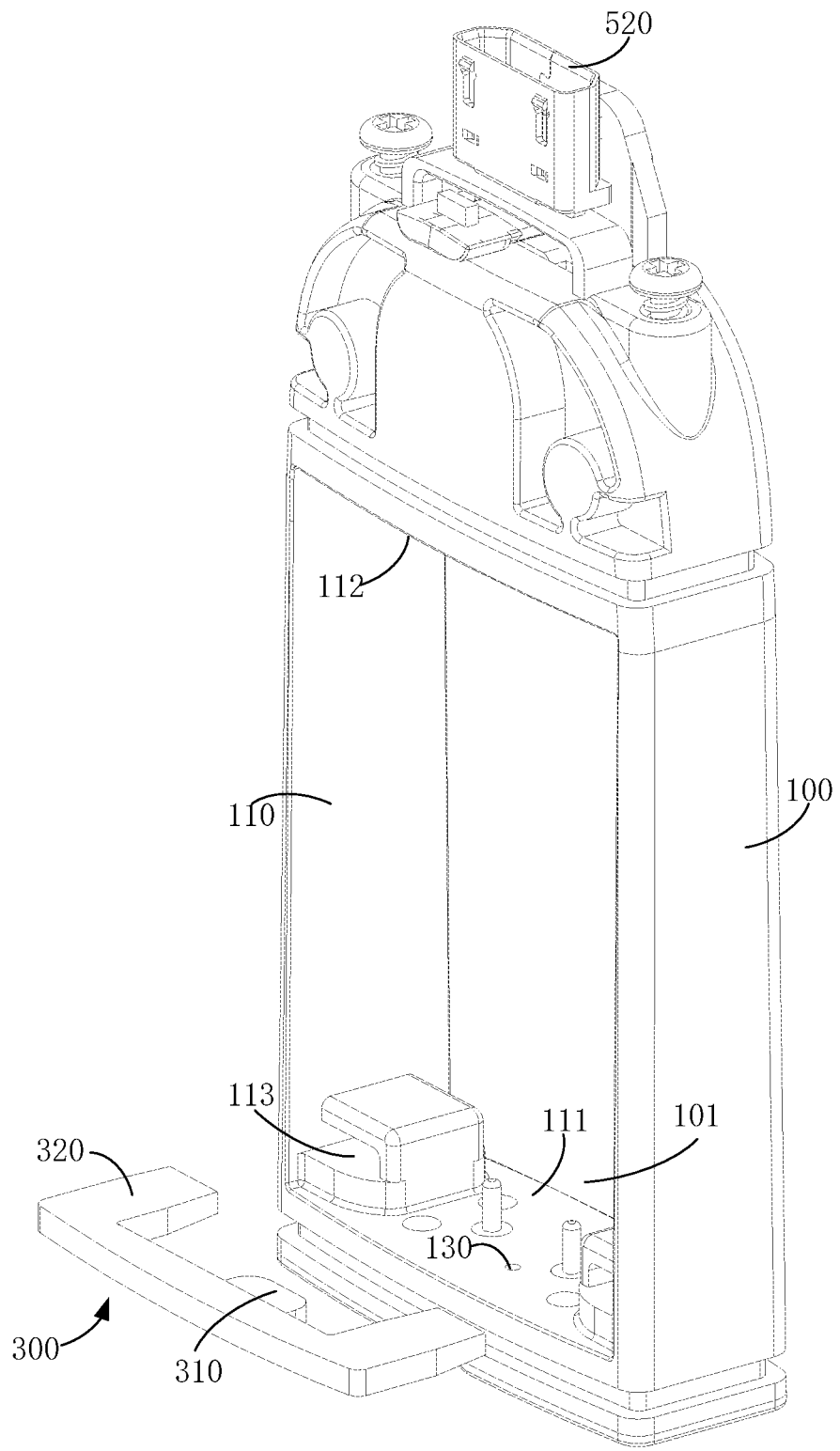
FIG. 6 is an exploded view of the electronic atomizing device in FIG. 5.
Figure 7:
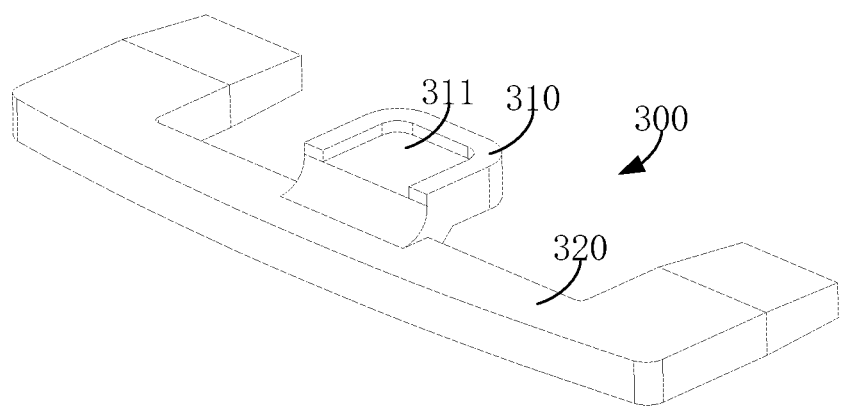
FIG. 7 is a perspective view of a cushion plug in FIG. 6.
Figure 8:
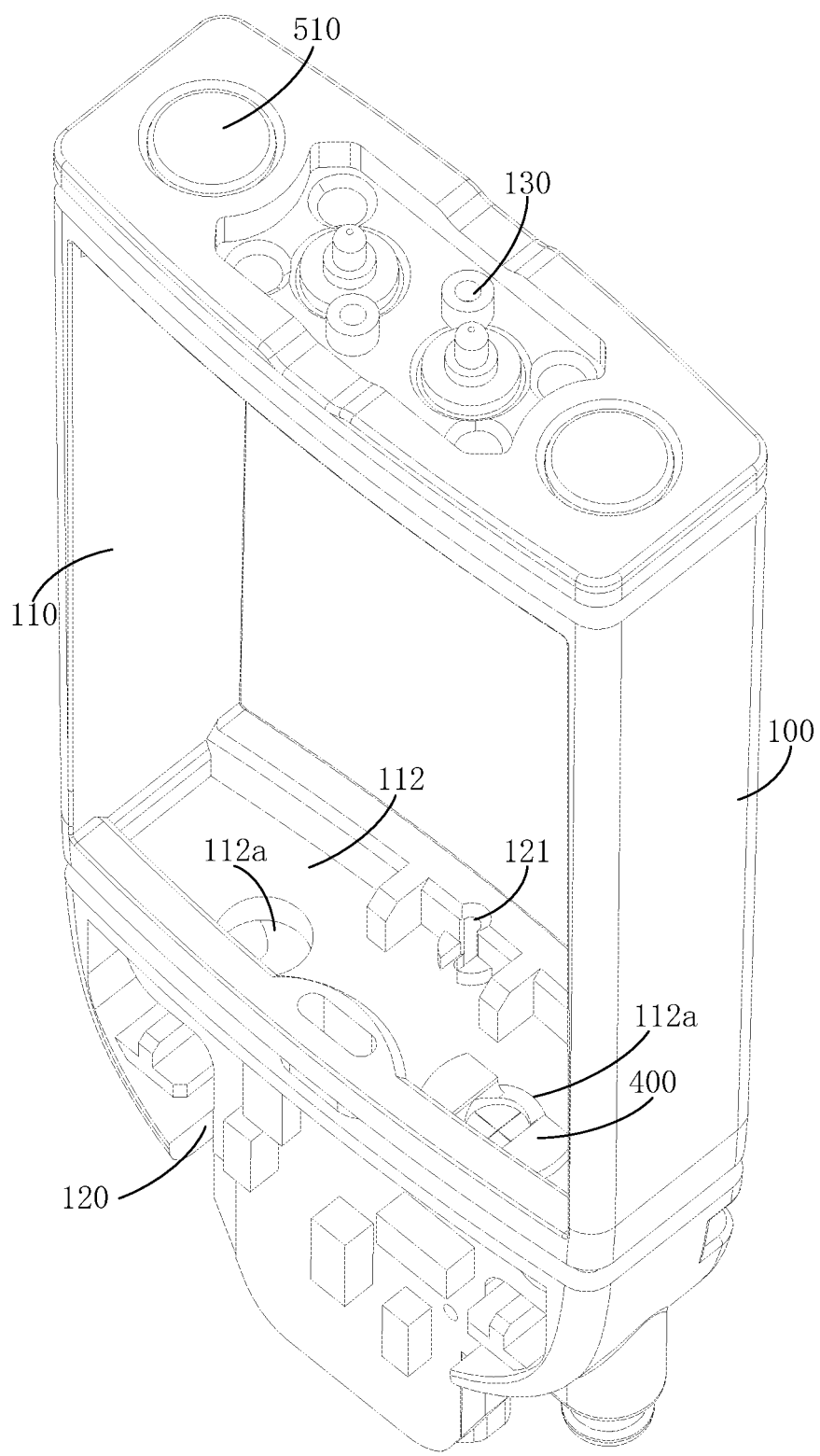
FIG. 8 is a perspective view of the electronic atomizing device in FIG. 5 from another perspective.
Figure 9:
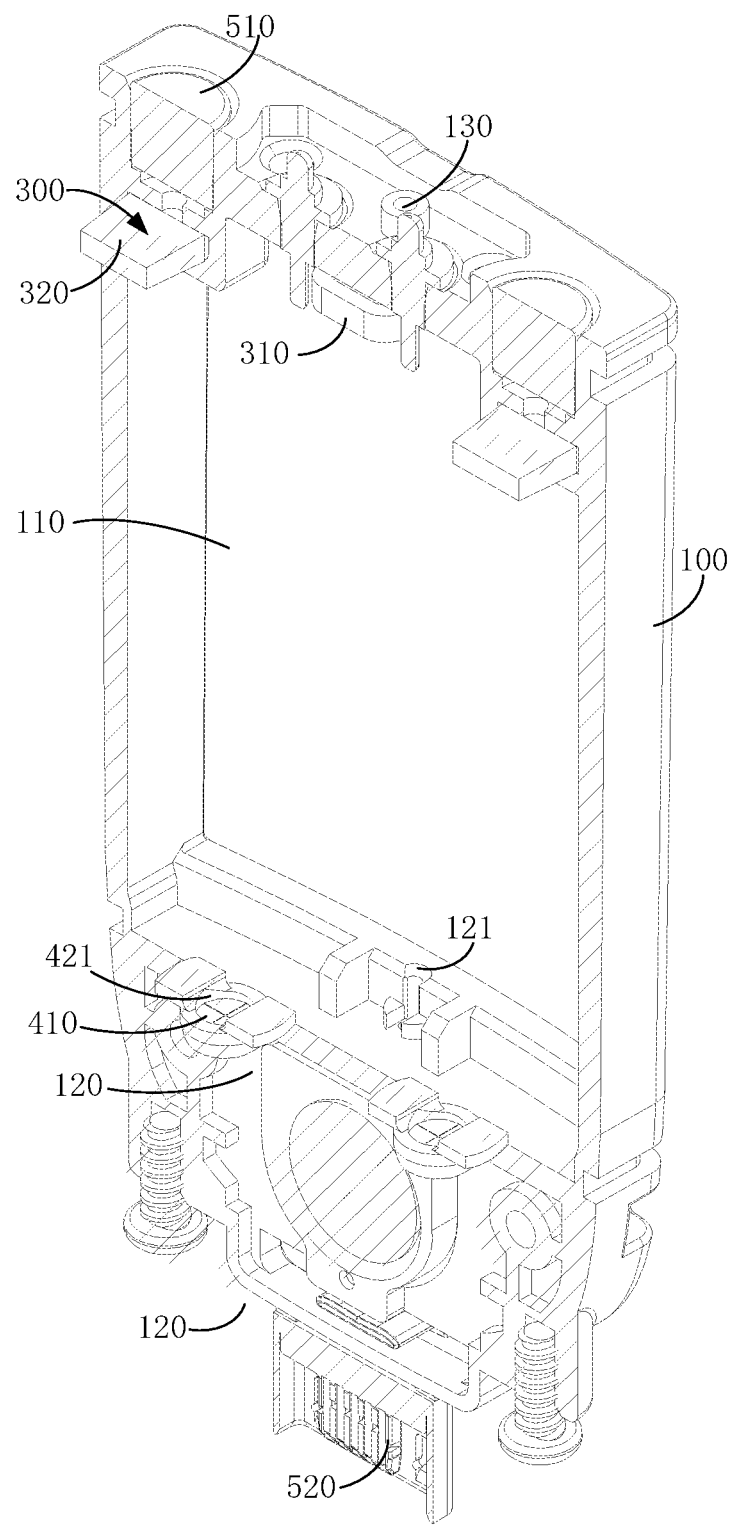
FIG. 9 is a perspective cross-sectional view of the electronic atomizing device in FIG. 8.
Figure 10:
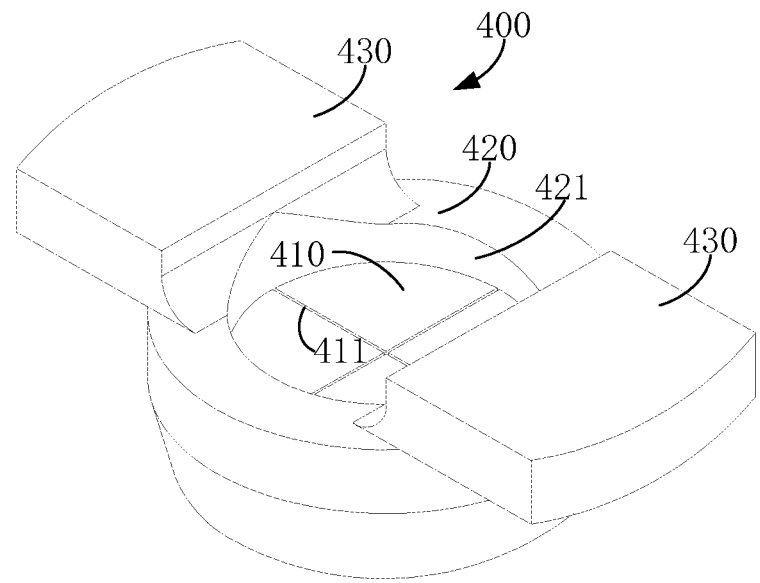
FIG. 10 is a perspective view of a relief plug of the electronic atomizing device in FIG. 1.
Figure 11:
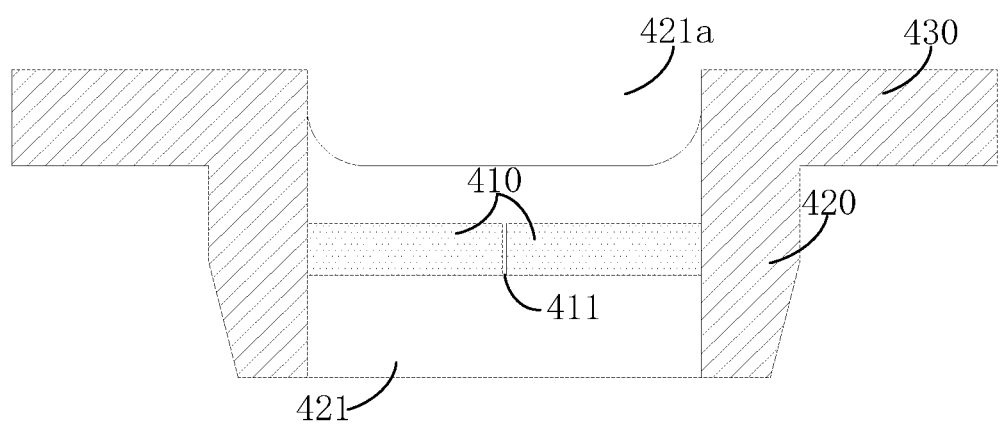
FIG. 11 is a cross-sectional view of the relief plug in FIG. 10.

Referring to FIGS. 2 to 4, in some examples, the power supply assembly 20 further includes a universal serial bus (USB) charging plug 520. The USB charging plug 520 is disposed in the air inlet channel 120. When the USB charging plug 520 is connected to an external charging device through a cable for the power supply assembly 20, the external charging device can charge the battery 200 through the USB charging plug 520, so that the battery 200 can be recycled multiple times.

As shown in FIG. 4, in some examples, the housing 100 includes two first abutting portions 141 and two second abutting portions 142. The two first abutting portions 141 are disposed opposite to each other in a left-right direction, and the two second abutting portions 142 are disposed opposite to each other in a front-back direction. The second abutting portions 142 are connected between the first abutting portions 141. A receiving hole 140 is enclosed cooperatively by the first abutting portions 142 and the second abutting portions 142. The atomizer 30 is received in the receiving hole 140. The first abutting portion 141 protrudes a first length h from a bottom wall of the receiving hole 140, and the second abutting portion 142 protrudes a second length H from the bottom wall of the receiving hole 140. The second length H exceeds the first length h. When the atomizer 30 is located in the receiving hole 140, the atomizer 30 abuts against top portions of the first abutting portions 141 and the second abutting portions 142 simultaneously. That is, the first abutting portions 141 and the second abutting portions 142 can play a role of limiting the mounting of the atomizer 30. As shown in FIG. 3, a side circumference of the atomizer 30 is recessed to form a recess 32, and the second abutting portions 142 can be engaged with the recess 32.

Figure 12:
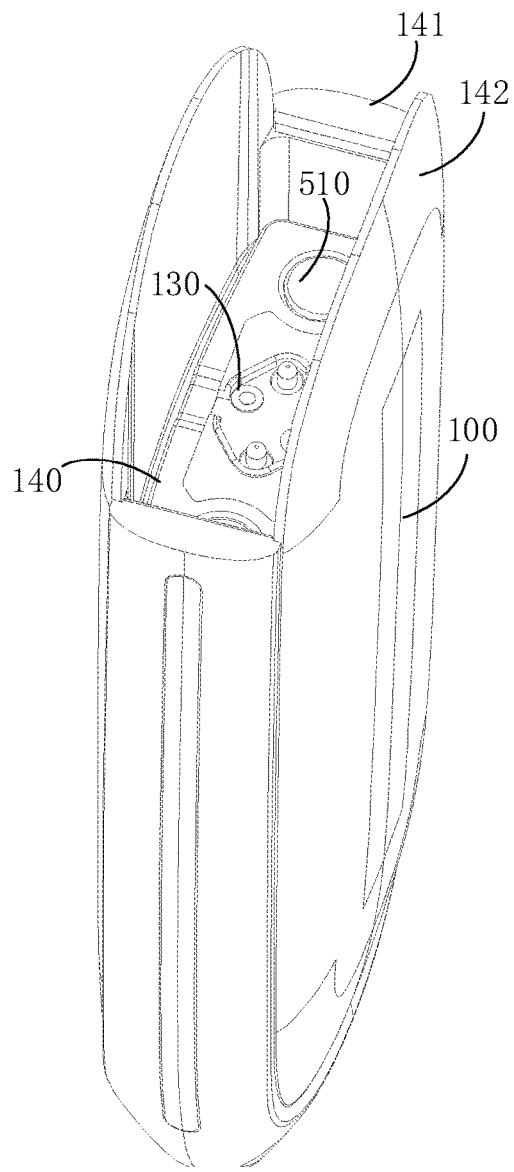
FIG. 12 is a perspective view of the electronic atomizing device in FIG. 1, where an atomizer is removed.
Figure 13:
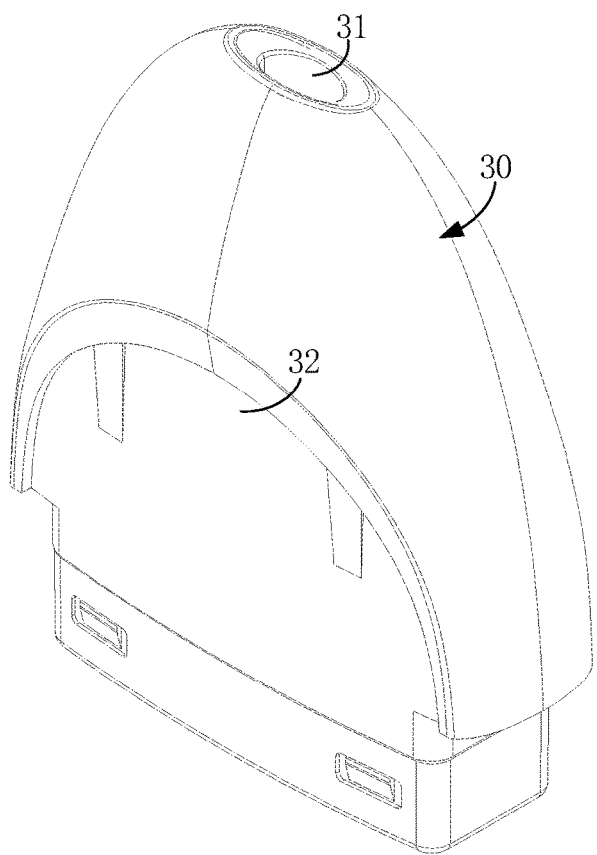
FIG. 13 is a perspective view of an atomizer of the electronic atomizing device in FIG. 1.

Referring to FIGS. 12 and 13, in some examples, the atomizer 30 is detachably connected to the housing 100. For example, the power supply assembly 20 further includes a magnetic element 510. The magnetic element 510 may be a permanent magnet. The magnetic element 510 may be embedded in the housing 100. A surface of the magnetic element 510 may be flush with the bottom wall of the receiving hole 140. When the atomizer 30 is received in the receiving hole 140, the magnetic element 510 applies a certain magnetic attraction force to the atomizer 30, so that the atomizer 30 is stably and reliably fixed on the housing 100, and the mounting and dismounting of the atomizer 30 on the housing 100 are also facilitated.

Figure 14:
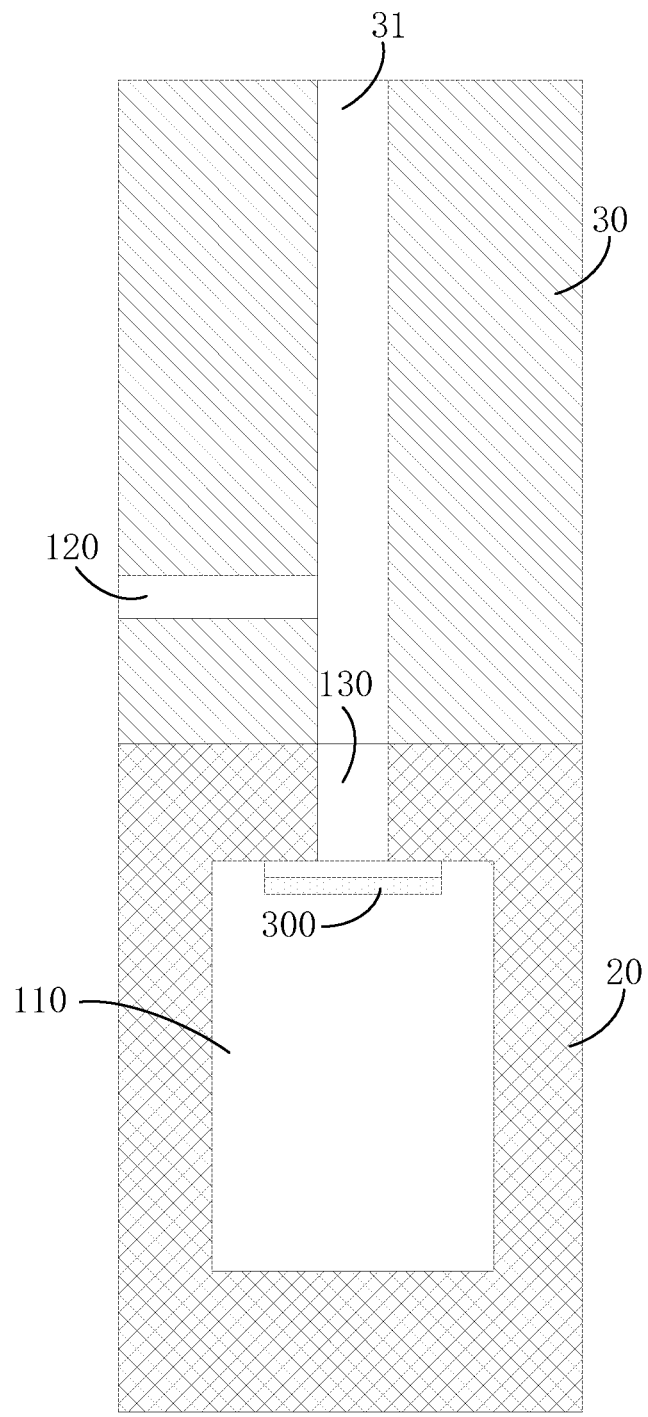
FIG. 14 is a cross-sectional view of an electronic atomizing device according to a second example in an embodiment.

Referring to FIG. 14, of course, an air inlet channel 120 of an electronic atomizing device according to a second example in the embodiment of the present disclosure is not provided on the power supply assembly 20, but is directly provided on the atomizer 30. The other structures of the electronic atomizing device according to the second example are similar to those of the electronic atomizing device 10 according to the first example. Therefore, when the user inhales through the air inhaling channel 31, the outside air does not need to pass through the receiving cavity 110 and the air guiding channel 130 from the air inlet channel 120 to enter the air inhaling channel 31, instead passes through the air inlet channel 120 on the atomizer 30 to directly enter the air inhaling channel 31.

The present disclosure also provides a power supply assembly. The power supply assembly includes the housing 100, the battery 200, and the cushion plug 300 as shown in FIGS. 1 to 13 in this embodiment. The housing 100 of the power supply assembly 20 can be provided with the air inlet channel 120, the receiving cavity 110, the sub-cavity 101, and the air guiding channel 130. When the user inhales through the air inhaling channel 31, the outside air passes through the receiving cavity 110, the sub-cavity 101, and the air guiding channel 130 from the air inlet channel 120 to enter the air inhaling channel 31. Of course, as shown in FIG. 14, the housing 100 of the power supply assembly may not be provided with the air inlet channel 120.

As shown in FIGS. 15 and 16, an electronic atomization device 10 according to a first example in another embodiment of the present disclosure includes an atomizer 700, a cushion plug 800, and a power supply assembly 900. The atomizer 700 includes a housing assembly 600, an atomizing assembly 710, and a base assembly 720. The power supply assembly 900 includes a housing 910 and a battery 21. The housing 910 is provided with a receiving cavity 911 in which the battery 21 is located. The housing assembly 600 may be integrally formed with the housing 910. The atomizer 700 can atomize the liquid represented by the aerosol generating substrate to form aerosol for inhalation by the user.

Referring to FIGS. 15 and 16, in some examples, the housing assembly 600 may be generally tubular in shape. The housing assembly 600 includes a housing 610 and an inhaling nozzle 620. The housing 610 is provided with a tubular cavity in which the atomizing assembly 710 and the base assembly 720 are received. The inhaling nozzle 620 is inserted into an end of the housing 610. The inhaling nozzle 620 is provided with an air inhaling hole 621 in communication with the outside. The aerosol formed by atomizing the liquid by the atomizer 700 flows through the air inhaling hole 621. The user can inhale the aerosol through the air inhaling hole 621 at the inhaling nozzle 620.

Figure 17:
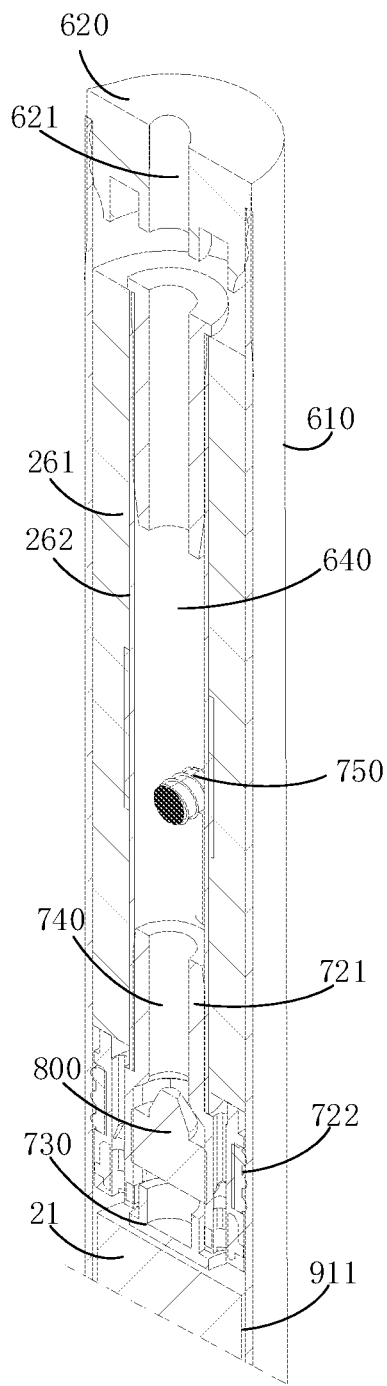
FIG. 17 is a perspective view of the electronic atomizing device in FIG. 16.
Figure 18:
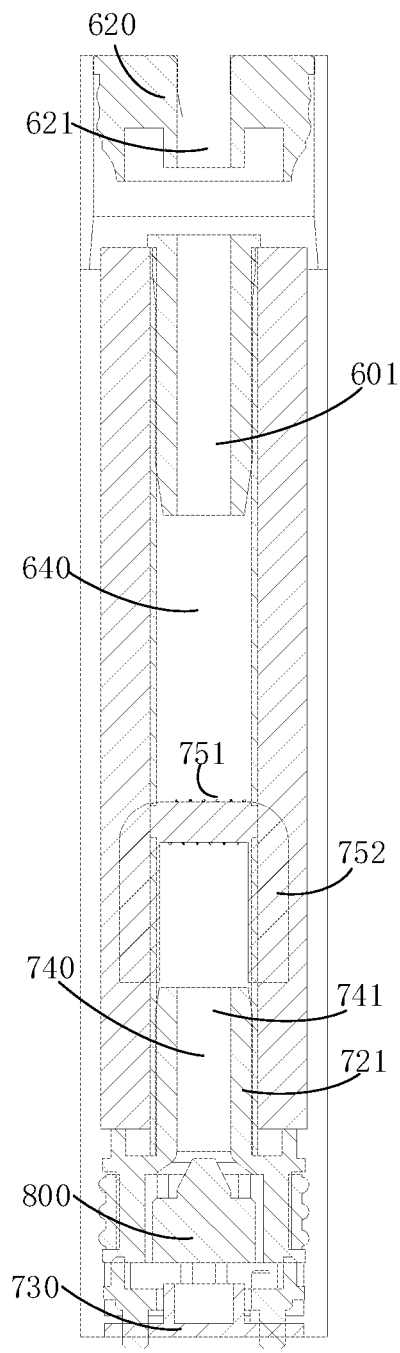
FIG. 18 is another partial cross-sectional view of the electronic atomizing device in FIG. 15.
Figure 22:
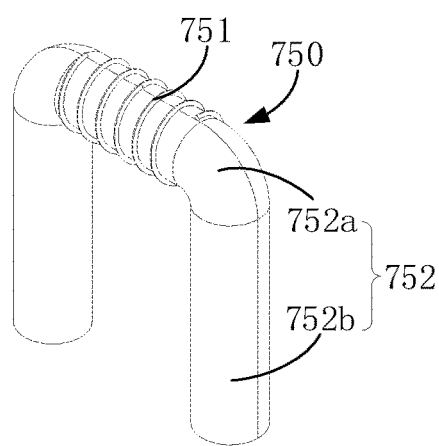
FIG. 22 is a perspective view of a heating unit in FIG. 15.

Referring to FIGS. 16 and 17, in some examples, the atomizing assembly 710 includes a heating unit 750 and a liquid storage unit 760. The liquid storage unit 760 includes a glass fiber tube 762 and a liquid storage member 761. The glass fiber tube 762 has a very good structural strength. The glass fiber tube 762 encloses a channel 640 for air circulation. The channel 640 is in communication with the air inhaling hole 621 and forms an air inhaling channel 601 with the air inhaling hole 621. The air inhaling channel 601 is used for passing the air and the aerosol, and the air and the aerosol in the air inhaling channel 601 can be inhaled by the user through the air inhaling hole 621. The liquid storage member 761 may be sandwiched between the glass fiber tube 762 and the housing 610. The liquid storage member 761 may be made of cotton, such that liquid can permeate into the liquid storage member 761, and the liquid storage member 761 can store the liquid. The heating unit 750 includes a liquid guiding strip 752 and a heating wire 751. The heating wire 751 can be in a spiral shape. Referring to FIGS. 18 and 22, the heating wire 751 is wound around a middle portion of the liquid guiding strip 752 and located in the air inhaling channel 601. The heating wire 751 is connected to the battery 21. When the battery 21 supplies power to the heating wire 751, the heating wire 751 generates heat. Both ends of the liquid guiding strip 752 respectively pass through the glass fiber tube 762 and are inserted into the liquid storage member 761. For example, the liquid guiding strip 752 may include one first portion 752a in a horizontal direction and two second portions 752b in a vertical direction. The two second portions 752b are respectively connected to both ends of the first portion 752a and extend toward the same side of the first portion 752a, such that the liquid guiding strip 752 is formed in a "⌐" shape. The first portion 752a is located in the air inhaling channel 601, and the heating wire 751 is wound on the first portion 752a. The two second portions 752b are inserted into the liquid storage member 761, respectively. The entire liquid guiding strip 752 has a good liquid guiding function. The liquid in the liquid storage member 761 is transferred to the first portion 752a through the second portions 752b. When the heating wire 751 generates heat, the heating wire 751 atomizes the liquid on the first portion 752a to form aerosol for inhalation by the user.

Referring to FIGS. 16 and 17, in some examples, the base assembly 720 includes a mounting portion 722 and an insertion portion 721 that are connected to each other. A size of a cross section of the mounting portion 722 is greater than that of the insertion portion 721. The mounting portion 722 and the insertion portion 721 are disposed coaxially. The battery 21 is disposed opposite to the mounting portion 722. For example, the battery 21 is located below the mounting portion 722. The insertion portion 721 is inserted in the air inhaling channel 601. Referring to FIGS. 19 and 20, a first hole 742 is disposed in the mounting portion 722, and a second hole 741 is disposed in the insertion portion 721. A size of a cross section (hole size) of the first hole 742 is greater than a size of a cross section (hole size) of the second hole 741. The first hole 742 and the second hole 741 may be circular holes or the like disposed coaxially. In this case, the first hole 742 and the second hole 741 together form a stepped hole. A top wall 742a of the first hole 742 forms a stepped surface.

Referring to FIGS. 19 and 20, in some examples, the cushion plug 800 may be a silicone plug, that is, the cushion plug 800 may be made of silicone material. The cushion plug 800 is located in the first hole 742. A position where the cushion plug 800 is kept at a predetermined distance from the top wall 742a of the first hole 742 is defined as a first station 11. A position where the cushion plug 800 abuts against the top wall 742a of the first hole 742 is defined as a second station 12. In order to fix the cushion plug 800 on the base assembly 720, the cushion plug 800 may include a first blocking portion 810 having a cylindrical shape. The first blocking portion 810 forms an interference fit with the first hole 742.

A flow guiding channel is further formed between a side wall of the first hole 742 and an outer wall of the cushion plug 800. The first hole 742, the second hole 741, and the flow guiding channel together form the functional channel 740 for air to pass through. Referring to FIGS. 17 and 18, the air inlet channel 120 is provided on the housing 910 (as shown in FIG. 15). The air inlet channel 120 is in communication with the receiving cavity 911. The functional channel 740 is in communication with the receiving cavity 911 and the air inhaling channel 601. When the user inhales through the air inhaling hole 621, the outside air enters the air inhaling channel 601 by passing through the air inlet channel 120, the receiving cavity 911, and the functional channel 740 in sequence. Finally, the outside air entering the air inhaling channel 601 will mix with the aerosol and then be inhaled by the user through the air inhaling hole 621. The cushion plug 800 opens the flow guiding channel at the first station 11, so as to provide communication between the receiving cavity 911 and the air inhaling channel 601 through the functional channel 740. The cushion plug 800 blocks the flow guiding channel at the second station 12, such that the receiving cavity 911 cannot be in communication with the air inhaling channel 601 through the functional channel 740.

Figure 21:
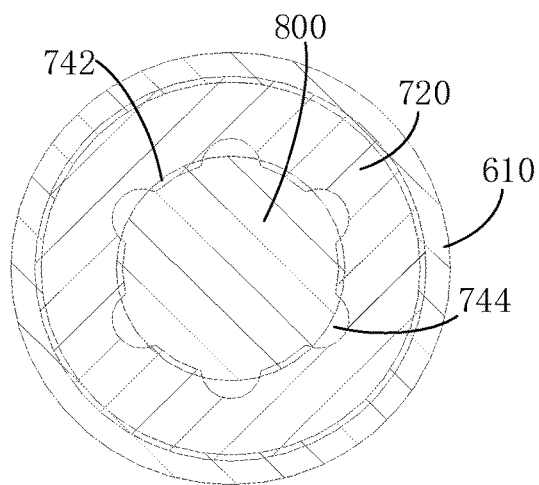
FIG. 21 is a cross-sectional view of the cushion plug in FIG. 20.

Referring to FIGS. 19 and 21, the flow guiding channel may be a plurality of slots 744 provided on the side wall of the first hole 742. The plurality of slots 744 are evenly arranged at intervals along the circumference of the first hole 742. The slots 744 extend a predetermined length along an axial direction of the first hole 742. That is, the slots 744 are provided vertically. Upper ends of the slots 744 may extend to the top wall 742a of the first hole 742. When the cushion plug 800 is located at the first station 11, the outside air passing through the air inlet channel 120 can enter the second hole 741 from the slots 744, so as to enter the air inhaling hole 621 through the air inhaling channel 601 for inhalation by the user. In this case, by the guiding of the air through the slots 744, the cushion plug 800 cannot block the whole functional channel 740. That is, the cushion plug 800 opens the functional channel 740. Referring to FIG. 20, when the cushion plug 800 is located at the second station 12, an upper end of the cushion plug 800 abuts against the top wall 742a of the first hole 742 to form a sealing effect, and the outside air passing through the air inlet channel 120 cannot enter the second hole 741 and the air inhaling channel 601 by passing through the slots 744. In this case, the functional channel 740 will lose the guiding effect to the gas, that is, the cushion plug 800 blocks the whole functional channel 740. Of course, the flow guiding channel may be a slot provided on the cushion plug 800. The structure of the slot may be the same as that of the slots 744 on the side wall of the first hole 742. In other examples, the flow guiding channel is provided inside the cushion plug 800. The flow guiding channel is a through hole extending through both end surfaces of the cushion plug 800. An axial projection of the through hole is located outside the outline of the second hole 741. When the cushion plug 800 abuts against the top wall 742a of the first hole 742, the top wall 742a will close the through hole of the cushion plug 800, thereby blocking the flow guiding channel.

When the battery 21 works normally, the difference between the air pressure in the receiving cavity 911 and the air pressure in the air inhaling channel 601 is less than the threshold pressure. Under the action of the friction force, the cushion plug 800 is located at the first station 11 and opens the functional channel 740, and the user can inhale the aerosol through the inhaling nozzle 620. When the battery 21 explodes under extreme conditions, the difference between the air pressure in the receiving cavity 911 and the air pressure in the air inhaling channel 601 exceeds the threshold pressure. Under the impact of the explosion, the cushion plug 800 will overcome the friction force and move upward from the first station 11. Due to the limiting effect of the top wall 742a of the first hole 742, the cushion plug 800 abuts against the top wall 742a of the first hole 742 to stop moving. In this case, the cushion plug 800 is located at the second station 12 and blocks the functional channel 740. The high-temperature gases and harmful substances generated by the explosion of the battery 21 cannot enter the air inhaling channel 601 from the receiving cavity 911 through the functional channel 740, thereby avoiding being inhaled by the user, and improving the safety performance of the entire electronic atomizing device 10. The threshold pressure may be in a range of 1 KPa to 2 MPa. The threshold pressure may specifically be 1 KPa, 2 KPa, 1.5 MPa or 2 MPa. The threshold pressure may also be in a range of 2 KPa to 2 MPa, or from 10 KPa to 1 MPa.

Therefore, when the cushion plug 800 is located at the first station 11, since the cushion plug 800 forms an interference fit with the first hole 742, there is sufficient static friction force between the cushion plug 800 and the first hole 742, when the battery 21 is normal, the cushion plug 800 will be fixed at the first station 11 under the action of the static friction force. When the battery 21 explodes, the cushion plug 800 will move from the first station 11 to the second station 12 against the static friction force under the impact of the explosion, thereby blocking the functional channel 740.

Figure 23:
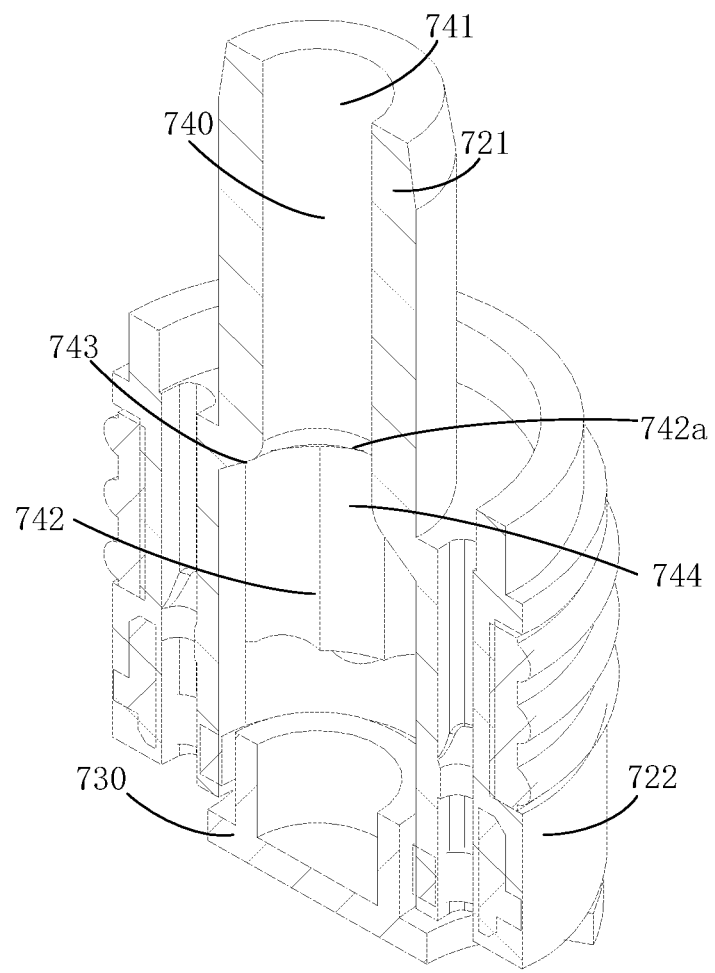
FIG. 23 is a perspective view of a structure in FIG. 19, where the cushion plug is removed.
Figure 24:
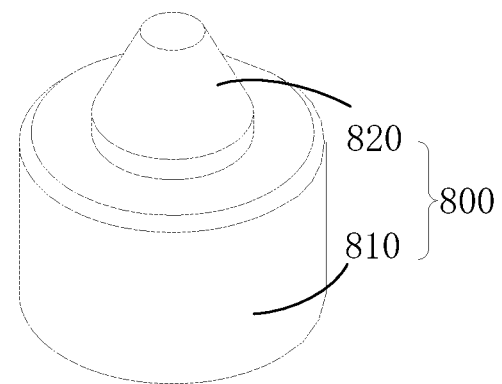
FIG. 24 is a perspective view of the cushion plug in FIG. 15.

Referring to FIGS. 23 and 24, in some examples, the base assembly 720 may also be provided with a tapered hole 743. The tapered hole 743 becomes a portion of the functional channel 740. The tapered hole 743 is located between the first hole 742 and the second hole 741. For example, an upper end (a small head end) of the tapered hole 743 is butted with the second hole 741, a lower end (a large head end) of the tapered hole 743 is butted with the first hole 742, such that the tapered hole 743 is in communication with the first hole 742 and the second hole 741. In addition, the cushion plug 800 further includes a second blocking portion 820 connected to the first blocking portion 810. A shape of the second blocking portion 820 is substantially tapered and is adapted to the shape of the tapered hole 743. Under the impact of the explosion of the battery 21, while the first blocking portion 810 abuts against the top wall 742a of the first hole 742, the second blocking portion 820 will form a certain interference fit with the tapered hole 743. At this time, the first blocking portion 810 abuts against the top wall 742a of the first hole 742 to form a first sealing against the functional channel 740, and the second blocking portion 820 will be engaged with the tapered hole 743 to form a second sealing against the functional channel 740. That is, the cushion plug 800 forms a double sealing to the functional channel 740, which further enhances the sealing effect of the cushion plug to the functional channel 740, and more effectively prevents the high-temperature gases and harmful substances from entering the air inhaling channel 601 from the functional channel 740, thereby further improving the safety performance of the electronic atomizing device 10.

Referring to FIG. 16, in some examples, the atomizing assembly 710 may further include a stopper 730. The stopper 730 may be connected to an end of the mounting portion 722 of the base assembly 720, that is, the stopper 730 is located below the mounting portion 722 and is located above the battery 21, such that the stopper 730 is disposed opposite to the battery 21. An orthographic projection of the stopper 730 on the mounting portion 722 covers the entire functional channel 740. Therefore, the liquid leaking from the functional channel 740 will stay on the stopper 730 by the blocking effect of the stopper 730, thereby preventing the leaked liquid from entering the battery 21 to damage the battery 21.

Figure 25:
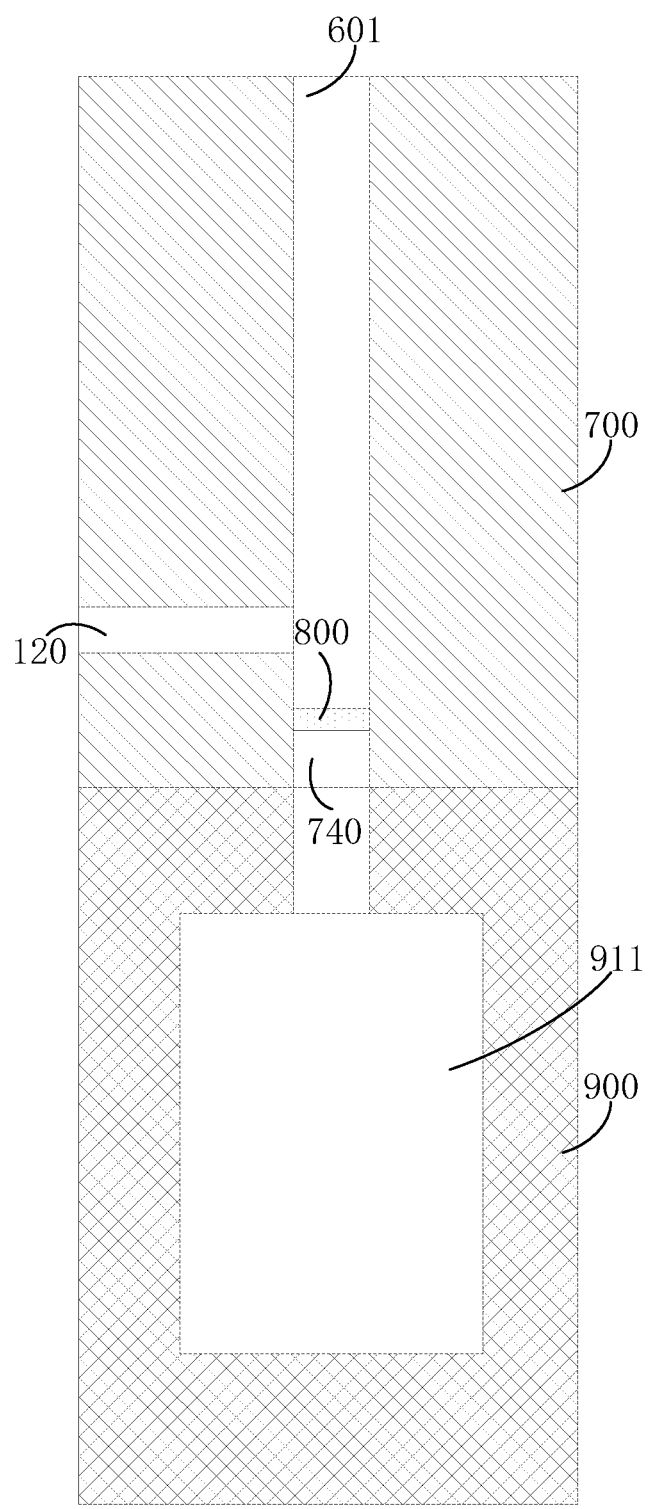
FIG. 25 is a cross-sectional view of an electronic atomizing device according to a second example in another embodiment.

Referring to FIG. 25, an air inlet channel 120 of an electronic atomizing device according to a second example in another embodiment is provided on the atomizer 700. The other structures of the electronic atomizing device according to the second example are similar to those of the electronic atomizing device 10 according to the first example. Therefore, when the user inhales through the air inhaling channel 601, the outside air does not need to pass through the receiving cavity 911 and the functional channel 740 from the air inlet channel 120 to enter the air inhaling channel 601, instead passes through the air inlet channel 120 on the atomizer 700 to directly enter the air inhaling channel 601. Alternatively, the air inlet channel 120 may be closer to the power supply assembly 900 than the position shown in FIG. 25, and located below the cushion plug 800. In this case, when the user inhales through the air inhaling channel 601, the outside air enters the air inlet channel 120, passes through the functional channel 740, and then enters the air inhaling channel 601.

The present disclosure also provides an atomizer, which includes the housing assembly 600, the atomizing assembly 710, the base assembly 720, and the cushion plug 800 in the electronic atomizing device as shown in FIGS. 15 to 24. When the user inhales through the air inhaling channel 601, the outside air enters the air inhaling channel 601 by passing through the functional channel 740 from the air inlet channel 120. Of course, as shown in FIG. 25, the air inlet channel 120 is provided on the atomizer 700, the outside air directly enters the air inhaling channel 601 from the air inlet channel 120.

Each the technical features of the embodiments described above can be arbitrarily combined. In order to simplify the description, all possible combinations of each technical features in the above embodiments have not been described. However, as long as there is no contradiction in the combination of these technical features, it should be considered as that all of them fall within the scope recorded in this specification.

The above described embodiments only present several implementation manners of the present disclosure, and descriptions thereof are more specific and detailed, but they cannot be understood as limiting the scope of the application patent. It should be noted that, to those of ordinary skill in the art, several modifications and improvements can be made without departing from the concept of the present disclosure, which all fall within the protection scope of the present disclosure. Therefore, the protection scope of this application patent shall be subject to the appended claims.

What is claimed is:

1. An electronic atomizing device, comprising:
an atomizer provided with an air inhaling channel therein for inhalation of aerosol;
a power supply assembly comprising a battery, wherein the power supply assembly is connected to the atomizer and supplies power to the atomizer, the power supply assembly is provided with a receiving cavity configured to receive the battery;
a functional channel providing communication between the air inhaling channel and the receiving cavity; and
a cushion plug disposed in the functional channel;
wherein when a difference between air pressure in the receiving cavity and air pressure in the air inhaling channel is less than a threshold pressure, the cushion plug is located at a first station, such that the functional channel is in an open state, when the difference between the air pressure in the receiving cavity and the air pressure in the air inhaling channel exceeds the threshold pressure, the cushion plug moves from the first station to a second station, such that the functional channel is in a closed state.

2. The electronic atomizing device according to claim 1, wherein the threshold pressure is in a range of about 1 KPa to about 2 MPa.

3. The electronic atomizing device according to claim 2, wherein the threshold pressure is in a range of about 2 KPa to about 2 MPa.

4. The electronic atomizing device according to claim 1, wherein the cushion plug encounters resistance to movement from the first station to the second station in the functional channel.

5. The electronic atomizing device according to claim 1, wherein the power supply assembly is further provided with an air inlet channel providing communication between outside and the receiving cavity, outside air is capable of entering the air inhaling channel by sequentially passing through the air inlet channel, the receiving cavity, and the functional channel.

6. The electronic atomizing device according to claim 1, wherein the atomizer is provided with an air inlet channel providing communication between outside and the air inhaling channel, outside air is capable of directly entering the air inhaling channel by passing through the air inlet channel.

7. The electronic atomizing device according to claim 1, wherein the power supply assembly further comprises a housing, the receiving cavity is provided in the housing, the housing has a first end wall disposed adjacent to the atomizer, the receiving cavity is located on a side of the first end wall away from the atomizer, the functional channel comprises an air guiding channel provided on the first end wall, the cushion plug is elastically connected to the housing, and disposed on the side of the first end wall away from the atomizer; when the cushion plug moves from the first station to the second station by overcoming an elastic resistance, the cushion plug abuts against the first end wall and blocks the air guiding channel.

8. The electronic atomizing device according to claim 7, further comprising a relief plug, wherein the housing further has a second end wall defining a portion of a boundary of the receiving cavity, the second end wall is farther away from the atomizer than the first end wall, the relief plug is connected to the second end wall, when an air pressure difference applied on the relief plug exceeds a predetermined value, the relief plug is capable of forming a relief channel providing communication outside and the receiving cavity.

9. The electronic atomizing device according to claim 8, wherein the second end wall is provided with a fixing hole providing communication between the receiving cavity and the outside, the relief plug comprises:
a sleeve engaged with the fixing hole and provided with a through hole;
a lug connected to the second end wall; and
a plurality of leaflets arranged on a side wall of the through hole at intervals in a circumferential direction; when an air pressure difference applied on the plurality of leaflets is less than a predetermined value, all of the leaflets at least shield a portion of the through hole, when the air pressure difference applied on the plurality of leaflets exceeds the predetermined value, the leaflets move close to the side wall, such that the through hole is opened to form the relief channel.

10. The electronic atomizing device according to claim 1, wherein the cushion plug is disposed in the functional channel by means of interference fit, when the difference between the air pressure in the receiving cavity and the air pressure in the air inhaling channel exceeds the threshold pressure, the cushion plug moves from the first station to the second station by overcoming a frictional resistance.

11. The electronic atomizing device according to claim 10, wherein the atomizer comprises: an atomizing assembly above which the air inhaling channel is located; and
a base assembly inserted into the air inhaling channel, and wherein the functional channel is located above the base assembly.

12. The electronic atomizing device according to claim 11, wherein the base assembly is provided with a first hole and a second hole in communication with the first hole, a size of a cross section of the second hole is less than a size of a cross section of the first hole, and the second hole is in communication with the air inhaling channel; the cushion plug is located in the first hole, a flow guiding channel is further formed between a side wall of the first hole and an outer wall of the cushion plug, or a flow guiding channel is further formed in the cushion plug; the first hole, the second hole, and the flow guiding channel together form the functional channel;
wherein, when the cushion plug is kept at a predetermined distance from a top wall of the first hole to open the flow guiding channel, the cushion plug is located at the first station; when the cushion plug abuts against the top wall of the first hole to block the flow guiding channel, the cushion plug is located at the second station.

13. The electronic atomizing device according to claim 12, wherein the functional channel further comprises a tapered hole in communication with the first hole and the second hole, the tapered hole is located between the first hole and the second hole, the cushion plug comprises:
a first blocking portion engaged with the first hole; and
a second blocking portion connected to the first blocking portion,
when the cushion plug is located at the second station, the first blocking portion abuts against a bottom wall of the first hole, and the second blocking portion is engaged with the tapered hole.

14. The electronic atomizing device according to claim 12, wherein the flow guiding channel is a slot provided on the side wall of the first hole or the outer wall of the cushion plug.

15. The electronic atomizing device according to claim 12, wherein the flow guiding channel is a through hole provided in the cushion plug, and an axial projection of the through hole is located outside an outline of the second hole.

16. The electronic atomizing device according to claim 11, wherein the atomizing assembly further comprises a stopper connected to an end of the base assembly, the stopper is disposed opposite to the battery, an orthographic projection of the stopper on the base assembly covers the functional channel.

17. A power supply assembly of an electronic atomizing device, configured to be connected to an atomizer provided with an air inhaling channel, wherein the power supply assembly comprises a battery and a cushion plug, the power supply assembly is provided with a functional channel and a receiving cavity, the functional channel is in communication with the receiving cavity and the air inhaling channel, the battery is located in the receiving cavity, the cushion plug is located in the functional channel;

when a difference between air pressure in the receiving cavity and air pressure in the air inhaling channel is less than a threshold pressure, the cushion plug is located at a first station, such that the functional channel is in an open state, when the difference between the air pressure in the receiving cavity and the air pressure in the air inhaling channel exceeds the threshold pressure, the cushion plug moves from the first station to a second station, such that the functional channel is in a closed state.

18. The power supply assembly according to claim 17, wherein the power supply assembly is further provided with an air inlet channel, outside air is capable of entering the air inhaling channel by sequentially passing through the air inlet channel, the receiving cavity, and the functional channel.

19. An atomizer of an electronic atomizing device, configured to be connected to a power supply assembly, the power supply assembly comprising a battery, the power supply assembly is provided with a receiving cavity configured to receive the battery, wherein the atomizer comprises a cushion plug and is provided with a functional channel and an air inhaling channel, the air inhaling channel is configured for inhalation of aerosol, the functional channel is in communication with the receiving cavity and the air inhaling channel, the cushion plug is located in the functional channel;

when a difference between air pressure in the receiving cavity and air pressure in the air inhaling channel is less than a threshold pressure, the cushion plug is located at a first station, such that the functional channel is in an open state, when the difference between the air pressure in the receiving cavity and the air pressure in the air inhaling channel exceeds the threshold pressure, the cushion plug moves from the first station to a second station, such that the functional channel is in a closed state.

20. The atomizer according to claim 19, wherein the atomizer is further provided with an air inlet channel providing communication between outside and the air inhaling channel, outside air directly enters the air inhaling channel by passing through the air inlet channel.

* * * * *